March 28, 1944.　　W. M. FOUNTAIN　　2,345,252
DIFFERENTIAL
Filed June 24, 1941　　2 Sheets-Sheet 1
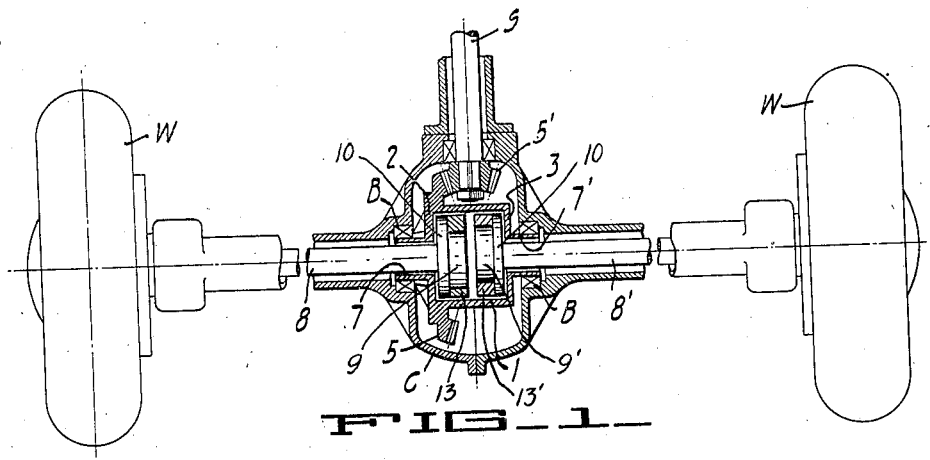
FIG_1_
FIG_2_
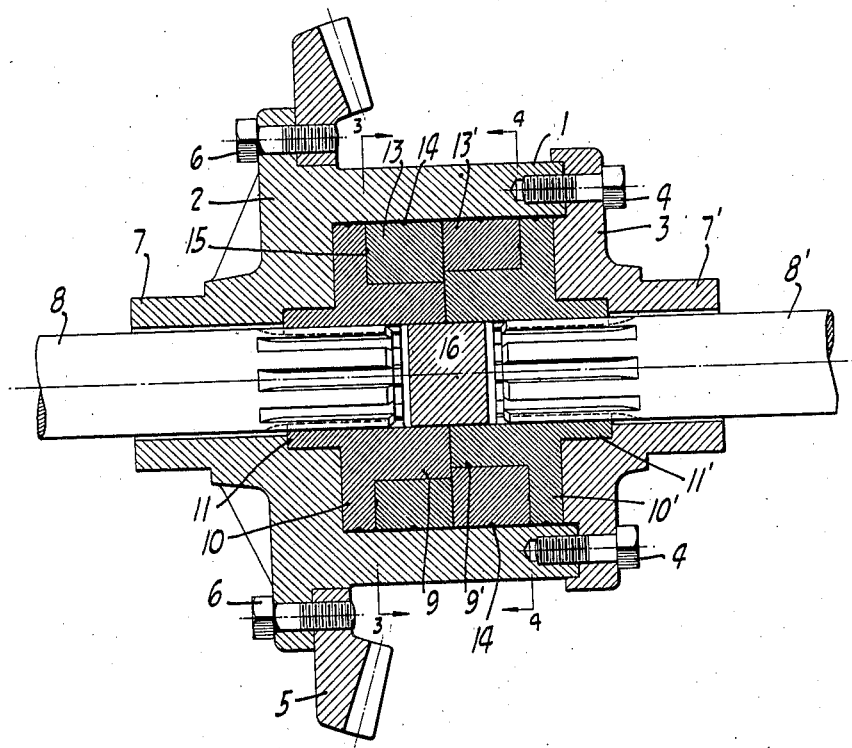
INVENTOR
William M. Fountain
BY Boyken & Mohler
ATTORNEYS March 28, 1944. W. M. FOUNTAIN 2,345,252
DIFFERENTIAL
Filed June 24, 1941 2 Sheets-Sheet 2
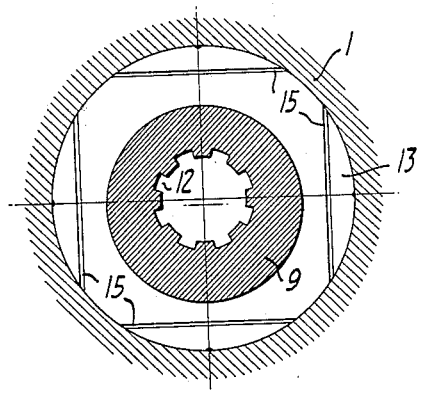
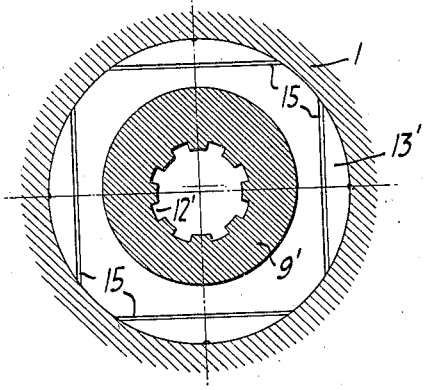
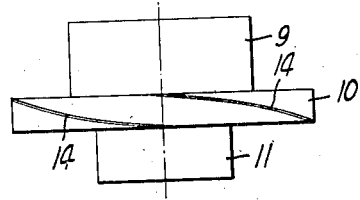
INVENTOR
William M. Fountain
BY Boykin & Mohler
ATTORNEYS Patented Mar. 28, 1944

2,345,252

UNITED STATES PATENT OFFICE 2,345,252

DIFFERENTIAL

William M. Fountain, San Francisco, Calif., assignor, by mesne assignments, of one-fourth to William F. Wood, Piedmont, Calif.

Application June 24, 1941, Serial No. 399,470

7 Claims. (Cl. 74—389.5)

This invention relates to a differential, or torque distributor, for driving a pair of coaxial axles from a single drive shaft, as is done in the present automobile, while permitting different speeds between the two axles.

One of the objects of this invention is a differential in which the driving torque is maintained on the axle that carries the wheel having the greatest resistance to slippage on the road where the driving torque and road condition is such as to otherwise cause slippage of one of the ground wheels on one of the driven axles, irrespective of whether the vehicle is making a turn or is moving straight ahead, and which differential, under normal road conditions and in normal driving, will permit the inside wheel to rotate at the desirable slower speed than the outtside wheel when the vehicle is making a turn.

Another object is the provision of a simple, strong, and economically manufactured differential in a vehicle, which differential insures the automatic establishment of a quick and positive driving connection between the single drive shaft in such vehicle and either one or the other of the drive wheels, or both of such wheels according to the tractive efficiency of the drive wheels for propelling the vehicle over the ground, the driving torque being equally distributed between the drive wheels when their tractive efficiency is equal, and being maintained with respect to the wheel having greatest resistance to slippage where the resistance to slippage is unequal, or which driving torque is substantially wholly transferred to the wheel having ground resistance to turning when the other wheel is off the ground, or when the axle to such other wheel is broken.

A still further object is the provision of a full floating, gearless differential that provides a positive driving connection between the single drive shaft and the axles in which substantially all of the usual play or backlash is eliminated, where, for example, forward driving power is applied to the axles, after the vehicle in which the differential is installed has been rolling forward against the compression of the engine, or after the vehicle has been coasting, or after a reverse movement of the vehicle, or when starting the vehicle from a standstill. This substantial elimination of the play or backlash also occurs on application of reverse or rearward driving power when applied on the drive axles, when the vehicle is rearwardly driven from a standstill or has been rolling rearwardly against compression of the engine.

Other objects and advantages will appear in the specification and drawings annexed hereto.

In the drawings,

Fig. 1 is a semi-diagrammatic view of the invention in position on an automobile.

Fig. 2 is a sectional view through my improved differential taken in the plane of the coaxial axles, the latter being indicated in elevation.

Fig. 3 is a sectional view taken along line 3—3 of Fig. 2.

Fig. 4 is a sectional view taken along line 4—4 of Fig. 2.

Fig. 5 is an elevational view of one of the eccentrics that is adapted to be splined to one axle.

In the conventional automobile differential, if one of the drive wheels should strike an obstruction, or encounter a resistance, that is sufficient to cause that wheel to stop, while allowing the other wheel to rotate, the driving torque will be substantially entirely transmitted to such other wheel, or if one of the driving axles should break so as to be incapable of driving the wheel on such broken axle, the driving torque will be transmitted to the portion of the broken axle still connected with the drive shaft through the differential. In the above instances, it will be seen that the engine will be ineffective for moving the vehicle. Also with the conventional differential, where one of the drive wheels of an automobile bounces clear of the ground while the other wheel has driving traction, the driving torque will be concentrated on the free wheel rather than on the wheel having efficient traction. Thus, substantially the sole purpose of the conventional differential is to enable the rear, or drive wheels to revolve at different rates of speed when the vehicle is making a turn.

In the present invention, the driving torque of the single drive shaft is maintained to the wheel having greatest tractive efficiency on the ground, where such tractive efficiency is unequal, when the vehicle is being driven. By "tractive efficiency" is meant that traction between the ground and driving ground wheels of the vehicle that will effect a forward or rearward movement of the vehicle over the ground when the wheels are driven. Equal tractive efficiency in the wheels results when the amount of power applied to the ground wheels will move the vehicle without slippage of either wheel or tire on the ground, or with equal slippage of both wheels.

If the ground or pavement engaged by one wheel is sufficiently slippery to result in that wheel slipping under the power applied thereto where a conventional differential is used, while the outer wheel would not slip, by reason of its greater frictional resistance to slippage, the differential of this invention will result in automatically maintaining the driving torque to said other wheel, hence the said other wheel cannot slip since the driving torque is not unbalanced in favor of the first mentioned wheel. However, the differential of this invention will function to automatically permit the two driving wheels to revolve at different speeds when the vehicle is making a turn, with the inner wheel revolving slower than the outer wheel, and apparently with the driving torque applied to the inner wheel, unless the inner wheel has insufficient traction to drive the automobile or vehicle, in which latter case the outside wheel has sufficient traction to drive the automobile, will take the driving load with sufficient driving torque to so propel the automobile or vehicle.

From the foregoing, it will be seen that the use of this invention in an automobile, for instance, will increase the driving efficiency of the engine with a resultant increase in mileage obtained per gallon of fuel. Also the life of the tires on the driving wheels will be prolonged, and driving is easier, and the skidding hazards will be reduced. Furthermore, as long as one of the driving axles is intact and operative, the automobile may be driven.

In detail, the differential of this invention, comprises a tubular housing 1 having a uniform diameter inner cylindrical side. This housing is formed with a head 2 at one end that is preferably formed integrally with the housing, and a head 3 at the opposite end opposed to head 2, which latter head is preferably detachably secured to the housing by bolts 4.

A conventional ring gear 5 is rigidly secured to housing 1, coaxial with the bore of the latter, which ring gear may be integral with the housing, or may be detachably secured thereto by bolts 6 extending through an annular outwardly projecting flange on the housing.

The heads 2, 3 are centrally formed with axially aligned openings in hubs 7, 7' that are supported in the conventional roller bearings B (Fig. 1), for rotation of the housing. Coaxial axles 8, 8' pass through said openings into the housing. The usual ground or drive wheels W are secured in the usual manner to the opposite, outer ends of axles 8, 8' and a conventional drive pinion 5' on the single drive shaft S from the engine is adapted to engage the ring gear 5 for rotating the same and for rotating housing 1 and heads 2, 3. This ring gear, pinion, and ground wheels are all standard on automobiles, the housing 1 being enclosed within an outer differential case C, as well as the ring gear and pinion gear 5, which case carries the bearings B, and extensions on the case enclose the axles 8, 8', all as generally indicated in Fig. 1.

An eccentric 9 is provided for axle 8, and an identical eccentric 9' is provided for axle 8'. At one side of eccentric 9 is a radially outwardly projecting concentric flange 10, while an identical flange 10' is at one side of eccentric 9' and a concentric hub 11' projects from the side of flange 10' opposite eccentric 9'. The eccentric 9, flange 10, and hub 11 are formed integrally, and comprise one unit in the differential, while eccentric 9', flange 10' and hub 11' are likewise formed integrally, and comprise a second unit identical with the first mentioned unit. Each of said units is formed with a central bore therethrough, the walls of which are concentric with the flange and hub, and eccentric to the eccentric, the said units being enclosed within the housing 1 with the flanges substantially fitting the bore in the housing. The bores in the aforesaid units are formed with driving splines 12, 12' that receive the splined adjacent ends of axles 8, 8' so that rotation of either unit will cause similar rotation of the axle splined thereto. As seen in the drawings, the eccentrics 9, 9' are preferably wider than flanges 10, 10', although they may be of equal width.

The axially facing free sides of eccentrics 9, 9' face each other and are in substantially slidable engagement with each other, while the opposite outwardly facing sides of flanges 10, 10' are respectively in substantially slidable engagement with the opposed sides of heads 2, 3. The said heads 2, 3 are counterbored to rotatively receive hubs 11, 11'.

On eccentric 9 is an eccentric strap 13, having a cylindrical outer periphery of substantially the same diameter as the periphery of flange 10, and an identical eccentric strap 13' is supported on eccentric 9'. Thus straps 13, 13' are in slidable engagement or substantially in said engagement on their adjacent sides and their opposite sides slidably engage the lateral, opposed, axially facing sides of flanges 10, 10'.

The radially outwardly facing cylindrical sides of the flanges 10, 10' and of the eccentric straps 13, 13' are formed with oil grooves 14 that extend slantingly across said sides or peripheries, relative to their parallel outer edges, and the axially facing sides of the straps that are adjacent flanges 10, 10' are formed with oil grooves 15 that extend tangentially of an imaginary circle concentric therewith and disposed between the peripheries of the flanges and the peripheries of the eccentrics, as best indicated in Figs. 2, 3. Other oil grooves, as desired, may be provided to facilitate smooth operation of the differential at all times and to reduce wear.

Between the adjacent ends of axles 8, 8' is a cylindrical spacer 16 that spaces the adjacent ends of the axles, which is rotatable and slidable axially in the bores in eccentrics 9, 9'.

In operation, assuming the drive wheels on axles 8, 8' engage the ground or pavement with equal traction, the rotation of housing 1 by the engine will induce immediate rotation of the eccentric straps 13, 13' in the same direction, and will cause substantially immediate locking of the axles and housing for rotation together as a unit, due to the wedging action of the straps between the inner side of the housing and the eccentrics 9, 9'. This may also force flanges 10, 10' against the inner side of the housing also, since the openings in hubs 7, 7' permit sufficient radial movements of the axles to enable such movement of the flanges 10, 10'. As long as the wheels on axles 8, 8' encounter substantial frictional resistance to turning, the driving connections between the axles and housing will be maintained. The only possible slippage that can occur when the automobile or vehicle is being driven relatively straight ahead on a road, is when the driving torque to the wheels is sufficient to cause both wheels to slip. Hence if one wheel encounters oil, water, ice, or loose sand, gravel, or the like, while the other is on a hard anti-skid surface, there will be no slippage of the first mentioned wheel, since the driving torque is maintained, without loss, to said other wheel and there is no increase in driving torque to the wheel that is on the oil, ice, etc.

In the event the axle 8 should become broken, or should the wheel on axle 8 have no frictional resistance on the road, then substantially the entire driving torque of the single drive shaft will be concentrated on axle 8', and the reverse would be true if the wheel on axle 8' were to have no resistance to turning, while the wheel on axle 8 was on the road, or had substantial resistance to turning.

Assuming the automobile is making a turn to the right, and axle 8' is the right hand axle, then the axle 8' will tend to slow down, while axle 8 would tend to rotate faster, but inasmuch as the axle 8 cannot be positively driven directly from housing 1 at a faster rate of speed than that at which the housing 1 will drive the said axle, it will be seen that the inner axle 8' will be directly driven by the housing due to its being locked thereto through the medium of the eccentric 9' and strap 13' and the wheel on axle 8 will be carried around the turn at a faster rate of speed than the wheel on axle 8'. However, should the resistance to rotation of the wheel on axle 8' be reduced, so that this wheel fails to maintain the increased speed of the wheel on axle 8, then the sufficient driving torque will be applied to axle 8 from the housing to drive the automobile around the turn.

It is highly important to note the ratio between the inside diameter of the housing 1 and the degree of offset of each eccentric.

For example, in a differential in which the inside diameter of the housing 1 is substantially three and a quarter (3¼) to three and three-quarters (3¾) inches, the diameter of each eccentric strap and flange is substantially three thousandths (.003) to five thousandths (.005) of an inch less than said inside diameter, and the diameter of each eccentric 9, 9' is substantially two (2) to two and one-half (2½) inches, with the central axis of the eccentrics offset about one-sixteenth (1/16) to three thirty-seconds (3/32) of an inch relative to the central axis of the axles 8, 8'. The angle of the adjacent wedging surfaces at their point of engagement will thus be seen to be from about two (2°) to three (3°) degrees. The direct ratio between the offset of the eccentric and inside diameter of housing 1 should be substantially maintained for different sized differentials as above set forth.

From the construction heretofore described, it is seen that the differential of this invention is almost perfectly balanced on the axis of the axis of the housing 1, since the movement of the eccentric strap is only several thousandths of an inch offset relative to said axis. Where gears or spaced dogs are used, or where there is any reciprocation of elements in a differential housing, even though such gears, dogs, or elements, or any other spaced elements are employed, that rotate with the housing, there is a vibration created, even though the elements, whatever they may be, are counterbalanced by equal weights. Only where there is a counterbalance at all diametrically opposite points substantially equidistant from the axis of rotation, as in the present invention, is vibration reduced to its minimum.

In the present conventional differential from six to eight costly gears or elements, in addition to the axle spacer, axles and housing, are employed. In some attempts to accomplish the results of this invention, some or all of the gears have been eliminated, but in place of the eliminated gears, other even more costly elements, such as reciprocating blocks, splined clutch members, etc., have been added.

In this invention, in the preferred form, only two pairs of duplicate elements have been substituted, each of which elements is readily formed on a lathe, since only cylindrical surfaces are turned, except for the splines in the eccentrics, and a splined drive connection is common in all differentials, even where gears are employed. The simplicity of assembly and economy of manufacture, due to this construction, is far less than in any other differential of which I am aware.

Having described my invention, I claim:

1. A differential for motor vehicles comprising; two axles in alignment with each other; an eccentric member fixed to each of said shafts; an annular radially outwardly projecting flange integral with each eccentric, concentric with each axle; a wedging eccentric strap mounted on each of said eccentric members adjacent each of said flanges; a concentric drum-like housing enclosing said members, straps and flanges; the diameter of said housing being such as to provide a working clearance between said eccentric straps and said drum.

2. A differential for motor vehicles comprising; two axles in alignment with each other; an eccentric member fixed to each of said shafts; a wedging eccentric strap mounted on each of said eccentric members; a concentric drum-like housing enclosing said members and said straps; the diameter of said housing being such as to provide a working clearance between said eccentric straps and said drum; each of the said eccentric members with the strap mounted thereon being free for rotation relative to the other when the eccentric strap on one eccentric member or the other, or on both, is out of wedging relation with the housing, and said eccentric straps being arranged and adapted to move into and out of wedging relation with the housing upon relative rotation between the straps, housing and eccentric members when resistance to rotation is applied to the said members.

3. A differential for motor vehicles comprising; two axles in alignment with each other; an eccentric member fixed to each axle at their adjacent ends for shafts for rotation with said axles; and eccentric strap on each of said members freely rotatable on said members about the axis of the eccentric members respectively; the peripheral surfaces of said straps being cylindrical, and a generally drum-like housing enclosing said eccentric members and said straps having inner cylindrical sides concentric with the axis common to said axles; the outer diameter of said straps being slightly smaller than the inner diameter of said housing to provide a working clearance for relatively slight rotation of said straps relative to said eccentric members; the degree of offset of said eccentric members relative to the diameter of the inner sides of said housing being substantially the ratio of 3/32 of an inch to 3½ inches, and the working clearance between said straps and the cylindrical sides of said housing being from about .0015 to about .0025 inches.

4. A differential for motor vehicles comprising; two axles in alignment with each other; an eccentric member fixed to each axle at their adjacent ends; an annular flange concentric with each axle integral with each eccentric and projecting radially outwardly of the peripheral eccentric surfaces of said members; a drum-like housing enclosing said eccentric members and flanges having a cylindrical inner surface concentric with said flanges; means supporting said housing for rotation about the axis common to said shafts and about said flanges; an eccentric strap on each of said eccentrics having an axially outwardly facing cylindrical surface, the diameter of which is substantially that of the flanges; the said surface of each strap being slightly smaller in diameter than the inside diameter of said housing to enable slight rotation of said straps relative to said members, one of the axially facing sides of said members being substantially in frictional engagement and the said flanges integral with said members confining the straps therebetween against substantial axial movement of the straps relative to each other, and the tangent angles of said straps and of the inner sides of said housing having from about 2° to 3° difference at their engaging points, respectively, when said straps are rotated on said members to bring their said surfaces into engagement with the inner sides of said housing.

5. In an automobile, the combination, comprising; a pair of aligned axles respectively secured at their remote ends to a pair of ground engaging drive wheels that are adapted to drive said automobile over the ground; a housing rotatable relative to said axles enclosing their adjacent ends; power means directly connected with said housing for rotating the latter; separate means wholly enclosed within said housing carried by adjacent ends of said axles and rotatable relative to each other and to said housing, said separate means including separate wedging elements respectively arranged and adapted to wedgedly lock one or the other or both of said axles to said housing upon a predetermined frictional resistance to turning being applied to one or to the other or to both of said wheels; and said separate means being arranged and adapted to automatically release one only of said axles for free rotation thereof relative to said housing, and relative to the other of said axles, when said automobile is being driven around a corner by said power means.

6. In an automobile, the combination, comprising; a pair of aligned axles respectively secured at their remote ends to a pair of ground engaging drive wheels that are adapted to drive said automobile over the ground; a housing rotatable relative to said axles enclosing their adjacent ends; power means directly connected with said housing for rotating the latter about the axis common to said axles; separate means wholly enclosed within said housing respectively carried on said adjacent ends of said axles, said separate means being arranged and adapted to automatically lock to said housing for rotation therewith whichever of said wheels is on the ground under circumstances in which one or the other of said wheels is off the ground when said power means is driving said housing; said separate means being free from direct driving connection with each other and being fully rotatable relative to each other and to said housing; and each of said separate means including a releasable wedging element actuated by rotation of said housing to a position locking to said housing whichever one of said axles has greatest resistance to rotation of the wheel thereon.

7. In the combination as defined in claim 6, said housing and said separate means including said elements being arranged and adapted to revolve about the axis common to said axles and their mass weights being substantially balanced at any opposite sides of said axles radially outwardly of the axles.

WILLIAM M. FOUNTAIN.